United States Patent
Pawar et al.

(10) Patent No.: US 7,848,238 B1
(45) Date of Patent: Dec. 7, 2010

(54) USING VOIP-QUALITY METRICS TO DYNAMICALLY ADJUST THE EV-DO REVERSE ACTIVITY BIT

(75) Inventors: Hemanth Balaji Pawar, Overland Park, KS (US); Shilpa Kowdley Srinivas, Overland Park, KS (US); Anoop K. Goyal, Overland Park, KS (US); Jong-hak Jung, Overland Park, KS (US); Gustavo Enrique Ulffe Whu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 751 days.

(21) Appl. No.: 11/746,229

(22) Filed: May 9, 2007

(51) Int. Cl.
 *H04L 1/00* (2006.01)
(52) U.S. Cl. .................. 370/235; 370/342
(58) Field of Classification Search .......... 370/342, 370/232; 455/450, 436, 453, 443
 See application file for complete search history.

(56) References Cited

U.S. PATENT DOCUMENTS

| | | | |
|---|---|---|---|
| 6,021,328 A | 2/2000 | Curtis et al. | |
| 6,591,110 B1 | 7/2003 | Kim et al. | |
| 6,606,496 B1 | 8/2003 | Salvarani et al. | |
| 6,839,356 B2 | 1/2005 | Barany et al. | |
| 7,058,124 B2 | 6/2006 | Koo | |
| 7,099,283 B2 | 8/2006 | Matta et al. | |
| 7,245,915 B2 | 7/2007 | Matta et al. | |
| 7,474,627 B2 | 1/2009 | Chheda et al. | |
| 2003/0117956 A1 | 6/2003 | Lee | |
| 2004/0218533 A1* | 11/2004 | Kim et al. | 370/235 |
| 2005/0032522 A1 | 2/2005 | Soong et al. | |
| 2005/0052996 A1 | 3/2005 | Houck et al. | |
| 2006/0077994 A1* | 4/2006 | Spindola et al. | 370/412 |
| 2006/0250953 A1 | 11/2006 | Mooney et al. | |
| 2006/0252429 A1* | 11/2006 | Chen et al. | 455/450 |
| 2006/0291383 A1* | 12/2006 | Bi et al. | 370/229 |
| 2008/0049706 A1 | 2/2008 | Khandekar et al. | |

(Continued)

FOREIGN PATENT DOCUMENTS

WO  WO 2004/004249 A1  1/2004

OTHER PUBLICATIONS

Unpublished U.S. Appl. No. 12/141,569, filed Jun. 18, 2008 entitled "Method for Initiating Handoff of a Wireless Access Terminal Based on the Reverse Activity Bit".

(Continued)

*Primary Examiner*—Lewis G West
*Assistant Examiner*—Nathan Taylor

(57) ABSTRACT

Methods and systems are provided for using VoIP-quality metrics to dynamically adjust the EV-DO reverse activity bit (RAB). In one embodiment, an EV-DO access node provides VoIP service to EV-DO access terminals, which comprises (i) providing EV-DO service in a wireless coverage area and (ii) providing transport service over a packet-data network. The access node measures reverse noise rise (RNR) in the wireless coverage area. The access node further measures, over the packet-data network, each VoIP-quality metric in a set of one or more VoIP-quality metrics. The access node then determines whether to set or clear the RAB in the wireless coverage area based at least in part on the measured RNR and at least in part on the one or more measured VoIP-quality metrics.

12 Claims, 4 Drawing Sheets

U.S. PATENT DOCUMENTS

2009/0086629 A1 4/2009 Zhang et al.
2009/0170547 A1 7/2009 Raghothaman et al.
2009/0257361 A1* 10/2009 Deshpande et al. .......... 370/252

OTHER PUBLICATIONS

Unpublished U.S. Appl. No. 12/432,736, filed Apr. 29, 2009 entitled "Using DRCLocks for Conducting Call Admission Control".
Unpublished U.S. Appl. No. 12/350,694, filed Jan. 8, 2009 entitled "Using Packet-Transport Metrics for Call-Admission Control".
Unpublished U.S. Appl. No. 12/397,855, filed Mar. 4, 2009 entitled "Using Packet-Transport Metrics for Setting DRCLocks".
Unpublished U.S. Appl. No. 12/494,999, filed Jun. 30, 2009 entitled "Implementing Quality of Service (QoS) by Using Hybrid ARQ (HARQ) Response for Triggering the EV-DO Reverse Activity Bit (RAB)".
Unpublished U.S. Appl. No. 12/507,913, filed July 23, 2009 entitled "Achieving Quality of Service (QoS) by Using the Reverse Activity Bit (RAB) in Creation of Neighbor Lists for Selected Access Terminals".
Non-Final Office Action from U.S. Appl. No. 12/350,694 mailed Jun. 22, 2010.

* cited by examiner

| RF-QUALITY METRIC | RF-QUALITY-METRIC THRESHOLD |
|---|---|
| REVERSE NOISE RISE | RNR_THRESHOLD_202 |

THRESHOLD TABLE 200

| VOIP-QUALITY METRIC | VOIP-QUALITY-METRIC THRESHOLD |
|---|---|
| DELAY | DELAY_THRESHOLD_252 |
| JITTER | JITTER_THRESHOLD_254 |
| PACKET LOSS | PACKET_LOSS_THRESHOLD_256 |

THRESHOLD TABLE 250

FIG. 2

USING VOIP-QUALITY METRICS TO DYNAMICALLY ADJUST THE EV-DO REVERSE ACTIVITY BIT

BACKGROUND

1. Technical Field

The present invention relates to wireless communications, and, more particularly, to management of wireless communications between Evolution Data Optimized (EV-DO) access nodes and EV-DO access terminals.

2. Description of Related Art a. EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which includes one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

b. VoIP Communications

Note that the packet-data communication in which a given access terminal engages over the one or more packet-data networks to which the access node and the PDSN provide access may be of any one of a number of different types. One increasingly-popular type is VoIP communication. This VoIP communication may take the form of phone calls that appear similar or identical to normal voice calls conducted over CDMA networks, for example. This VoIP communication may also or instead take the form of push-to-talk (PTT) communications, known to those in the art. And any other type of VoIP communication may be engaged in by EV-DO access terminals instead of or in addition to the types noted herein.

Furthermore, a given EV-DO access terminal may engage in VoIP communications via an access node, a PDSN, and one or more packet-data networks (such as a service provider's privately-operated packet-data network and/or the Internet, as two examples) with one or more different types of endpoints. Examples of VoIP endpoints include one or more other EV-DO access terminals, one or more other mobile stations, one or more landline-connected telephones, one or more conferences servers, one or more gateways, and/or any other types of suitable VoIP endpoints. In cases of landline telephones, a media gateway may reside between a packet-data network and a telephone network such as the public switched telephone network (PSTN).

c. Session Setup

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet connection between the access node and the PDSN for the access terminal. The access node also facilitates establishment of a data link (e.g., a point-to-point protocol (PPP) connection) between the access terminal and the PDSN, and perhaps assignment (e.g., by the PDSN or by a Mobile-IP home agent) of an IP address to the access terminal.

Once those steps (and perhaps others) are complete, the access terminal has a session with the access node, and can therefore communicate over the packet-data network via the access node and the PDSN. Typically, the air-interface connection is then torn down, freeing up those radio resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it sends a connection request to the access node, which will assign a traffic channel to the access terminal. If the access node receives data addressed to the access terminal, the access node would typically page the access terminal, and assign it a traffic channel. The access terminal can then engage in packet-data communication over the packet-data network, using the newly-assigned traffic channel, as well as the previously-established IP address, radio-packet connection, and data link.

Note that an access node may, in a wireless coverage area such as a cell or sector, provide service on one or more carrier frequencies ("carriers"). When service is provided on only one carrier, the access terminal will, by default, communicate over a traffic channel on that carrier. When service is provided on more than one carrier, the access node will select one of those carriers on which to assign a traffic channel to the access terminal. In general, each carrier may occupy a 1.25-MHz-wide band of the RF spectrum. Furthermore, a carrier may actually be a pair of 1.25-MHz-wide bands, in systems that use a frequency-division-duplex (FDD) approach, where access terminals receive on one frequency, and transmit on another.

d. Reverse Noise Rise

Interference can be, and often is, present on a carrier in a sector. In general, on a given carrier in a given sector (i.e. on a given "sector/carrier"), an access node receives transmissions from access terminals that are operating on that sector/carrier. However, the access node often also receives transmissions on that sector/carrier from other access terminals, other devices, and/or any other sources of interference on that frequency.

At a given moment, the sum total of what an access node is receiving on a given sector/carrier is known as the "reverse noise" on that sector/carrier. At regular intervals, and in fact quite frequently (e.g., once for every forward-link timeslot (i.e. once every approximately 1.67 ms)), access nodes compute a value known as "reverse noise rise" (RNR), which is the difference between (i) the reverse noise that the access node is currently detecting and (ii) a baseline level of reverse noise. Thus, the access node computes how far the reverse noise has risen above that baseline.

To determine the baseline, EV-DO networks typically periodically utilize what is known as a silent interval, which may occur on the order of once every five minutes, and last on the order of 40-100 ms, both of which are typically configurable. During the silent interval, access terminals know not to transmit anything to the access node. The access node can then measure whatever else is out there. As such, the baseline corresponds to the amount of reverse noise when the sector/carrier is unloaded (i.e. without any transmitting access terminals). Note that other reverse-link-noise levels could be used as a baseline, other than the unloaded-sector level.

In general, the lower the RNR is at a given moment, the more favorable the RF conditions are for communication between access terminals and the access node at that moment. Correspondingly, the higher the RNR, the less favorable the RF conditions are. Also, a low RNR generally corresponds to a sector/carrier being lightly loaded, in other words that is supporting communications for a relatively low number of access terminals. A high RNR, as one might expect, generally corresponds to a sector/carrier being heavily loaded, in other words that is supporting communications for a relatively high number of access terminals.

e. Reverse Activity Bit (RAB)

Access nodes typically use the calculated value of RNR to, among other things, set what is known as the Reverse Activity Bit (RAB), which is a value that the access node makes equal to 0 or 1, and repeatedly transmits to all the access terminals operating on a given sector/carrier. Note that making the RAB equal to 0 (zero) is known as "clearing" the RAB, while making the RAB equal to 1 (one) is known as "setting" the RAB. As stated above, the access node typically calculates RNR at the same frequency at which it transmits forward-link timeslots, or once every 1.67 ms. The access node typically sets or clears the RAB at this same frequency.

With respect to how the access node chooses whether to set or clear the RAB, if the RNR is above a threshold (the "RNR threshold"), which may be about 5 dB, the access node sets the RAB. If the RNR is below the RNR threshold, the access node clears the RAB. The access node transmits the RAB in a TDM channel—known as the reverse-activity channel—on the forward link. That channel is itself a TDM portion of a forward-link channel known as the Media Access Control channel. Note that the RAB is the same for all access terminals on a sector/carrier. The manner in which those access terminals use the value of the RAB is explained below.

f. Access Terminals Using the RAB Under IS-856, Rel. 0

The initial release of IS-856 is referred to as Release 0 (zero) (Rel. 0), while a subsequent revision is referred to as Revision A (Rev. A). This subsection relates to how EV-DO access terminals use the RAB in EV-DO networks that operate according to Rel. 0, while the next subsection relates to how EV-DO access terminals use the RAB in EV-DO networks that operate according to Rev. A. Note that some EV-DO networks may provide both Rel. 0 and Rev. A service; that is, a given EV-DO network may provide service to access terminals that operate according to Rel. 0, and also to access terminals that operate according to Rev. A.

Under Rel. 0, access terminals can transmit data to access nodes on the reverse link at five different data rates: 9.6 kilobits per second (kbps), 19.2 kbps, 38.4 kbps, 76.8 kbps, and 153.6 kbps. Transmission at these various data rates involves using different types of coding for the data to be transmitted, among other differences. Note that, during a given instance of an access terminal transmitting data to an access node, the access terminal typically starts out using the lowest of those data rates, 9.6 kbps.

Recall that the EV-DO reverse link is essentially a CDMA channel over which the access terminal transmits data to the access node. And the access terminal does so in units of time known as frames, each of which last approximately 26.67 ms, which is the length of time of 16 timeslots on the forward link. And the network is synchronized on CDMA time, such that sets of 16 timeslots on the forward link will be aligned along reverse-link-frame time boundaries.

So, the EV-DO access terminal will transmit its first frame to the access node at 9.6 kbps. And then, for the next frame, the access terminal will stay at that rate, or perhaps transition up to 19.2 kbps. From there, frame by frame for all subsequent frames, the access terminal will transmit at the rate that it is currently using, transition up to the next-higher rate, or transition down to the next-lower rate. Note that rate-setting frequencies other than every frame, such as every four frames, could be used as well.

These (in this example) frame-by-frame decisions to maintain or change the reverse-link data rate are controlled by the RAB and by a table of reverse-link transitional probabilities (RLTPs) that are stored by each access terminal. This RLTP table is typically sent from the access node to the access terminal during the session-setup process described above, though it can also be sent (or updated) as new air-interface connections are made between the access node and the access terminal, or perhaps periodically, or perhaps in response to some other event.

The RLTP table typically contains eight probabilities, each expressed as an integer between 0 and 255, as explained more fully below. The eight probabilities correspond to the eight possible transitions among the five possible data rates. So, the transitional probabilities correspond to transitioning (in kbps) (1) from 9.6 up to 19.2, (2) from 19.2 up to 38.4, (3) from 38.4 up to 76.8, (4) from 76.8 up to 153.6, (5) from 153.6 down to 76.8, (6) from 76.8 down to 38.4, (7) from 38.4 down to 19.2, and (8) from 19.2 down to 9.6.

Typically, when an access terminal is at the start of transmitting a given frame at a given data rate (say, 38.4 kbps), the access terminal checks the RAB. If the RAB is cleared (i.e. equal to 0), the RNR in the sector is not above the RNR threshold, and thus the access terminal knows that it has two options with respect to the next frame: stay at 38.4 kbps or move up to 76.8 kbps. To determine which of those options the access terminal will take for the next frame, the access terminal generates a random integer between 0 and 255, and compares that random integer with the appropriate transitional probability. In this example, the access terminal would compare the random integer with the 38.4-kbps-to-76.8-kbps value.

If the random integer is less than or equal to the 38.4-kbps-to-76.8-kbps table value, the access terminal will transition up to 76.8 kbps for the next frame. If not, the access terminal will stay at 38.4 kbps for the next frame. The table value is thus a representation of a probability, since the integer that the access terminal compares with the table value is randomly generated. If, say, the table value were 255, the access terminal would have a probability of 1.00 (100%) for moving up to the next-higher data rate; if the table value were 0, the access terminal would only have a 1/256 probability of moving up. And so on.

If the RAB is set (again, equal to 1), however, the access node has decided that there is too much reverse noise on the sector/carrier at the moment, and thus the access terminal knows that it has two options with respect to the next frame. Again using 38.4 kbps as an example of the access terminal's current rate, the two options are to stay at 38.4 kbps or move down to 19.2 kbps. To determine which of those options the access terminal will take for the next frame, the access terminal again generates a random integer between 0 and 255, and compares that random integer with the appropriate reverse-link transitional probability. This time, the access terminal would compare the random integer with the 38.4-kbps-to-19.2-kbps value.

As with transitions up to higher data rates, when talking about transitions down to lower data rates, the access terminal checks whether the random integer it generates is less than or equal to the 38.4-to-19.2 table value. If so, the access terminal will transition down to 19.2 kbps for the next frame. If not, the access terminal will stay at 38.4 kbps for the next frame. Again, the table value represents a probability, as the integer that the access terminal compares with the table value is randomly generated. If, the table value were 255, the access terminal would have a probability of 1.00 (100%) for moving down to the next-lower data rate; if the table value were 0, the access terminal would only have a 1/256 probability of moving down. And so on.

g. Access Terminals Using the RAB Under IS-856, Rev. A

As explained above, under Rev. 0, reverse-link data rates are permitted only to increase or decrease by one step at a time (i.e. up to the next-higher data rate or down to the next-lower data rate), controlled by the RAB and the tables of reverse-link transitional probabilities. Under Rev. A, however, a more dynamic, iterative, equation-based approach is utilized, which permits data rates to change more rapidly. This approach is covered in IS-856, Rev. A, which is hereby incorporated herein by reference, in its entirety, as is IS-856, Rel. 0.

Briefly, under Rev. A, the access node still repeatedly transmits a RAB equal to 0 or 1. Each individual access terminal then uses that value to compute what are known as a Quick Reverse Activity Bit (QRAB) and a Filtered Reverse Activity Bit (FRAB). The QRAB is binary (equal to 0 or 1), while the FRAB is a real number having a value anywhere between −1 and 1 inclusive. The QRAB is a short-term, binary indication of loading: a QRAB of 1 is associated with congestion on the sector/carrier, while a QRAB of 0 is associated with non-congestion. The FRAB is more of a long-term, continuous, historical value, where values closer to −1 indicate a lower degree of congestion on the sector/carrier reverse link, while values closer to 1 indicate a higher degree of congestion. Thus, both the QRAB and the FRAB reflect the access terminal's interpretation of the RAB from the access node.

The access terminal then calculates a value known in Rev. A as "T2PInflow." T2PInflow is an iterative value: prior to each reverse-link transmission, it has a current value, and that current value is one of the inputs into determining its value in the next calculation. Note that the "T2P" prefixes to many of the value and function names in this explanation means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector/carrier), then T2PInflow will be decremented by the result of T2PDn(.); if, on the other hand, the access terminal sets QRAB to 0 (corresponding to a relatively non-congested sector/carrier), then T2PInflow will be incremented by the result of T2PUp(.). As with all of the details of these computations, the detailed equations can be found in IS-856, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate. Under IS-856, Rev. A, effective reverse-link data rates can range from 19.2 kbps up to 1.84 megabits per second (Mbps). As a final part of the calculation, the access terminal computes a value known as "T2POutflow" (also referred to as "actual T2POutflow") based on the computed packet size. The access terminal then updates the BucketLevel with the updated T2PInflow value and the newly-calculated (actual) T2POutflow value, so that the BucketLevel will be ready for the next iteration.

h. Conclusion

Thus, as explained, EV-DO access terminals use the value of the RAB in different ways under Rel. 0 and Rev. A of IS-856 for determining their reverse-link data rates. However, under both standards, and perhaps others, access nodes make repeated, periodic broadcasts of the RAB (equal to 0 or 1), and thus make repeated, periodic determinations as to whether to set or clear the RAB prior to each such broadcast.

SUMMARY

Methods and systems are provided for using VoIP-quality metrics to dynamically adjust the EV-DO reverse activity bit (RAB). In one aspect, an exemplary embodiment may take the form of a method. In accordance with the method, VoIP service is provided to EV-DO access terminals, wherein providing VoIP service comprises (a) providing EV-DO service in a wireless coverage area and (b) providing transport service over a packet-data network. Reverse noise rise (RNR) is measured in the wireless coverage area. Further, each VoIP-quality metric in a set of one or more VoIP-quality metrics is measured over the packet-data network. Finally, it is determined whether to set or clear the RAB in the wireless coverage area based at least in part on the measured RNR and at least in part on the one or more measured VoIP-quality metrics.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 2 is a simplified block diagram of two examples of metric-threshold data, in accordance with exemplary embodiments;

DETAILED DESCRIPTION OF EXEMPLARY EMBODIMENTS

1. Overview

Figure 1:
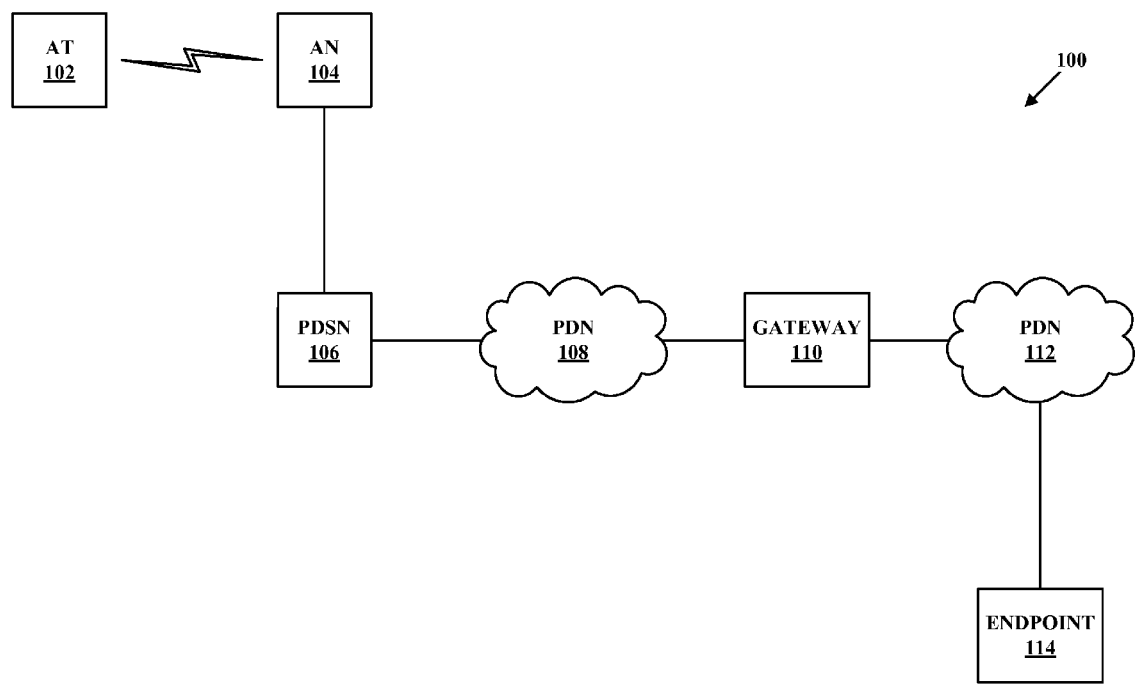
FIG. 1 is a simplified block diagram of a communication system, in accordance with exemplary embodiments.

As stated, EV-DO access terminals may engage in, among other types of packet-data communication, VoIP communication via the access node, the PDSN, and one or more packet-data networks to which the access node and the PDSN provide access. In general, VoIP is considered to be a relatively latency-sensitive type of packet-data communication. That is, it is important to VoIP communications that packets carrying bearer (i.e. voice) data traverse from source to destination quickly, consistently, and reliably, among other desirable descriptors.

Restated in terms typically used in the art, it is important and desirable that VoIP packets traverse between one endpoint of the communication (e.g. an EV-DO access terminal) and the other (e.g. a media gateway residing between a packet-data network, such as the Internet, and the PSTN) with relatively little delay, jitter, or packet loss. These terms are referred to herein, and generally known, as VoIP-quality metrics. Note as well that these metrics also apply to packet-data communication generally, not just VoIP. In general, if a particular VoIP call is associated with relatively poor values of delay, jitter, and/or packet loss, then the voice quality (experienced by one, both, or all participants) will be degraded. This is undesirable.

With respect to the first of the VoIP-quality metrics referenced above, delay is generally defined as the time taken for packets to get from one point to another in a network. Note that delay can be measured one-way, round-trip, or both. Typically, measuring round-trip delay is easier and requires less-expensive equipment. Note that, to obtain rough estimate of one-way delay, round-trip delay can be measured and then divided in half. A typical tolerance level for one-way delay in a VoIP context may be approximately 150-250 milliseconds (ms), before the quality of call degrades to a point that is generally considered unacceptable.

Jitter is typically defined as the variation in delay over some period of time between the network points for which the delay is measured. In general, if the delay of VoIP-packet transmissions varies too widely during a particular VoIP call, in other words if the jitter is too high, then the call quality typically would be significantly degraded. Finally, some number of VoIP packets that are transmitted along the data path between source and destination never make it to the destination. Packet loss, then, is typically defined as the ratio of (i) the number of packets that never make it to their destination to (ii) the total number of packets that were transmitted (including those that made it to their destination as well as those that did not) over some time period. The higher this ratio is, the more the VoIP call quality will be degraded.

In general, the VoIP-quality metrics referred to herein relate to the quality of network conditions (also referred to herein as "transport conditions" and "network-transport conditions") over the packet-data network(s) that the VoIP packets—sent to and from a given access terminal—will traverse. That is, when a given access node, and a given EV-DO network in general, provides VoIP service to a given access terminal, the access node is providing at least two services to that access terminal. The first is wireless EV-DO service over an air interface, and the other is transport service (i.e. connectivity) over one or more packet-data networks, such as direct transport service over the service provider's privately-operated packet-data network, and indirect transport service over a public packet-data network such as or including the Internet.

Thus, naturally, there will be times when transmission conditions are favorable with respect to the wireless service (i.e. times when favorable RF conditions prevail), and there will be times when poor RF conditions are present. As described above, current implementations of EV-DO networks deal with this, in among other ways, by setting the RAB when RF conditions are unfavorable (associated with a relatively high RNR), and by clearing the RAB when RF conditions are favorable (associated with a relatively low RNR).

When the RAB is set, access terminals can only maintain or decrease their reverse-link data-transmission rates, and consequently their reverse-link transmission power levels, which to some extent corrects the high-RNR situation. When the RAB is clear, access terminals can only maintain or increase their reverse-link data rates and power levels, which does cause RNR to increase, though this is considered acceptable when RNR is initially low enough—and of course it is desirable to grant higher reverse-link data rates to access terminals when tolerable.

And, just as naturally, there will also be times when transport conditions across the one or more packet-data networks (between (i) the access node and/or PDSN and (ii) the other endpoint or endpoints of the VoIP communication) will be favorable (e.g. when delay, jitter, and packet loss are all acceptably low), and there will be times when transport conditions are unfavorable (e.g. when delay, jitter, and/or packet loss are too high).

When transport conditions are unfavorable, it is not desirable to ramp up the data rates at which access terminals send VoIP packets to the access node. This disadvantageously results in attempting to transmit more and more VoIP data across a transport path to an endpoint, when that transport path is already struggling to adequately and acceptably transport VoIP packets. In current implementations, however, poor transport conditions are irrelevant to setting or clearing the RAB, and thus irrelevant to throttling wireless data rates up or down. Stated another way, in current implementations, the RAB is set or cleared independent of the transport conditions between the network infrastructure and the other endpoint(s) of the VoIP communication. IP congestion is not taken into account.

In accordance with the present invention, IP congestion is taken into account when deciding whether to set or clear the RAB. That is, one or more VoIP-quality metrics, related to the transport of VoIP packets across one or more packet-data networks, are taken into account when the access node determines whether to set or clear the RAB. The set of one or more VoIP-quality metrics that are considered may include delay, jitter, packet loss, and/or any other VoIP-quality metric now known or later developed. Note that the present invention applies to any and all types of networks, including those that operate according to IS-856, Rel. 0, those that operate according to IS-856, Rev. A, those that operate according to both Rel. 0 and Rev. A, and/or any other types of networks where access nodes determine whether to set or clear a RAB, including any networks that operate under any revisions of IS-856 subsequent to Rev. A.

In one embodiment, all three of delay, jitter, and packet loss may be considered, along with RNR, when determining whether to set or clear the RAB. In particular, the access node may maintain four threshold values: an RNR threshold (described above), as well as respective threshold values for delay, jitter, and packet loss (i.e. a delay threshold, a jitter threshold, and a packet-loss threshold). Each time the access node decides whether to set or clear the RAB, the access node may compare recently-measured values for each of RNR, delay, jitter, and packet-loss with their respective thresholds, and then only clear the RAB if each of those four measured values is less than its respective threshold. If any one of those measured values is greater than its respective threshold, the access node may set the RAB. This reflects a strategy to permit data-rate increases on the wireless reverse link only when both (i) RF conditions are favorable on that link and (ii) transport conditions are favorable on the transport side.

Note that the access node may consider RNR and the VoIP-quality metrics in any order, and may consider only one or two of the aforementioned VoIP-quality metrics. That is, the access node could consider (i) RNR and delay, (ii) RNR and jitter, (iii) RNR, delay, and packet loss, etc. In general, any combination of considering RNR and one or more VoIP-quality metrics may be employed when determining whether to set or clear the RAB. And for one or more VoIP-quality metrics (as well as RNR), it is conceivable that the access node could consider only a most-recently-measured value, an average over some previous time period, an average of a worst 10% (or some other percentage) of measurements over some previous time period, and/or any other relevant data set considered appropriate for a particular implementation.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, a packet-data network (PDN) 108, a gateway 110, a PDN 112, and an endpoint 114. Note that additional entities not depicted in FIG. 1 could be present as well. As an example, there could be more than one access terminal in communication with access node 104; also, there could be additional entities in communication with PDN 108 and/or PDN 112. Also, there could be one or more routers, switches, other devices and/or networks making up at least part of one or more of the communication links.

Access terminal 102 may be any mobile device arranged to carry out the access-terminal functions described herein. As such, access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO communications, including IS-856m Rel. 0 and/or IS-856, Rev. A communications. The chipset or wireless-communication interface in general may also be able to communicate with a CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multimode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals, such as access terminal 102, over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Access node 104 may provide service—including IS-856, Rel. 0 and/or IS-856, Rev. A service—to EV-DO access terminals on a number of carriers and in a number of wireless coverage areas, such as cells or sectors. On some or all of these carriers in some or all of these wireless coverage areas, access node 104 may have the ability to measure RNR. Access node 104 may further have the ability to measure (or obtain measurements of) one or more VoIP-quality metrics such as delay, jitter, and/or packet loss. Measurement of these VoIP-quality metrics is within the skill of those in the art.

Furthermore, access node 104 may store—or have access to—threshold values for RNR, and for a set of one or more VoIP-quality metrics. FIG. 2 depicts one possible arrangement of threshold data that access node 104 may store in data storage or may have access to from one or more other network entities, such as PDSN 106 and/or any other entities. FIG. 2 shows two threshold tables 200 and 250. Threshold table 200 includes only one threshold value in this example: RNR threshold 202, associated with the RF-quality metric RNR. Note that other RF-quality metrics could be stored in table 200—and considered in accordance with the present invention—instead of or in addition to RNR threshold 202.

Threshold table 250 includes VoIP-quality-metric threshold values associated with three VoIP-quality metrics: delay threshold 252 (associated with delay), jitter threshold 254 (associated with jitter), and packet-loss threshold 256 (associated with packet loss). Note that other VoIP-quality metrics could be stored in table 250—and considered in accordance with the present invention—instead of or in addition to delay threshold 252, jitter threshold 254, and packet-loss threshold 256.

Note as well that the thresholds 202 and 252-256 may take on any values suitable for a particular implementation. In some embodiments, RNR threshold 202 may be approximately 5-10 dB. In some embodiments, delay threshold 252 may be approximately 150-250 ms. In some embodiments, jitter threshold 254 may be approximately 10-20 ms. In some embodiments, packet-loss threshold 256 may be approximately 1%, 2%, 5%, or thereabouts. And other values could be used as well, without departing from the scope and spirit of the present invention.

Returning to FIG. 1, PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 104 and/or over PDN 108. Note that PDSN 106 may, instead or in addition, comprise a wireless-communication interface for communicating with access node 104 and/or over PDN 108. Note also that PDSN 106 may use the same interface or separate interfaces for communicating with access node 104 and for communicating over PDN 108. PDSN 106 may generally function to provide access node 104 with access to PDN 108.

Each of PDN 108 and PDN 112 may include one or more wide area networks, one or more local area networks, one or more public networks such as the Internet, one or more private networks, one or more wired networks, one or more wireless networks, and/or one or more networks of any other variety. Devices in communication with PDN 108 and/or PDN 112 may exchange data using a packet-switched protocol such as IP, and may be identified by an address such as an IP address. In this example, PDN 108 is the wireless-service provider's privately-operated IP network (where the wireless-service provider is the operator of access node 104 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are possible as well, without departing from the scope and spirit of the present invention.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface such as an Ethernet interface for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

Endpoint 114 may be any device arranged to carry out the endpoint functions described herein. As such, endpoint 114 may include a (wired and/or wireless) communication interface, a processor, and data storage comprising instructions executable by the processor for carrying out those endpoint functions. Endpoint 114 may be or include a media gateway (perhaps connected to the PSTN), a packet-based telephone, a personal computer, a PDA, a mobile station, an EV-DO access terminal, a PTT server, a call server, and/or any other type of device capable of functioning as an endpoint of a VoIP session in accordance with exemplary embodiments.

3. Exemplary Operation a. A First Exemplary Method

Figure 3:
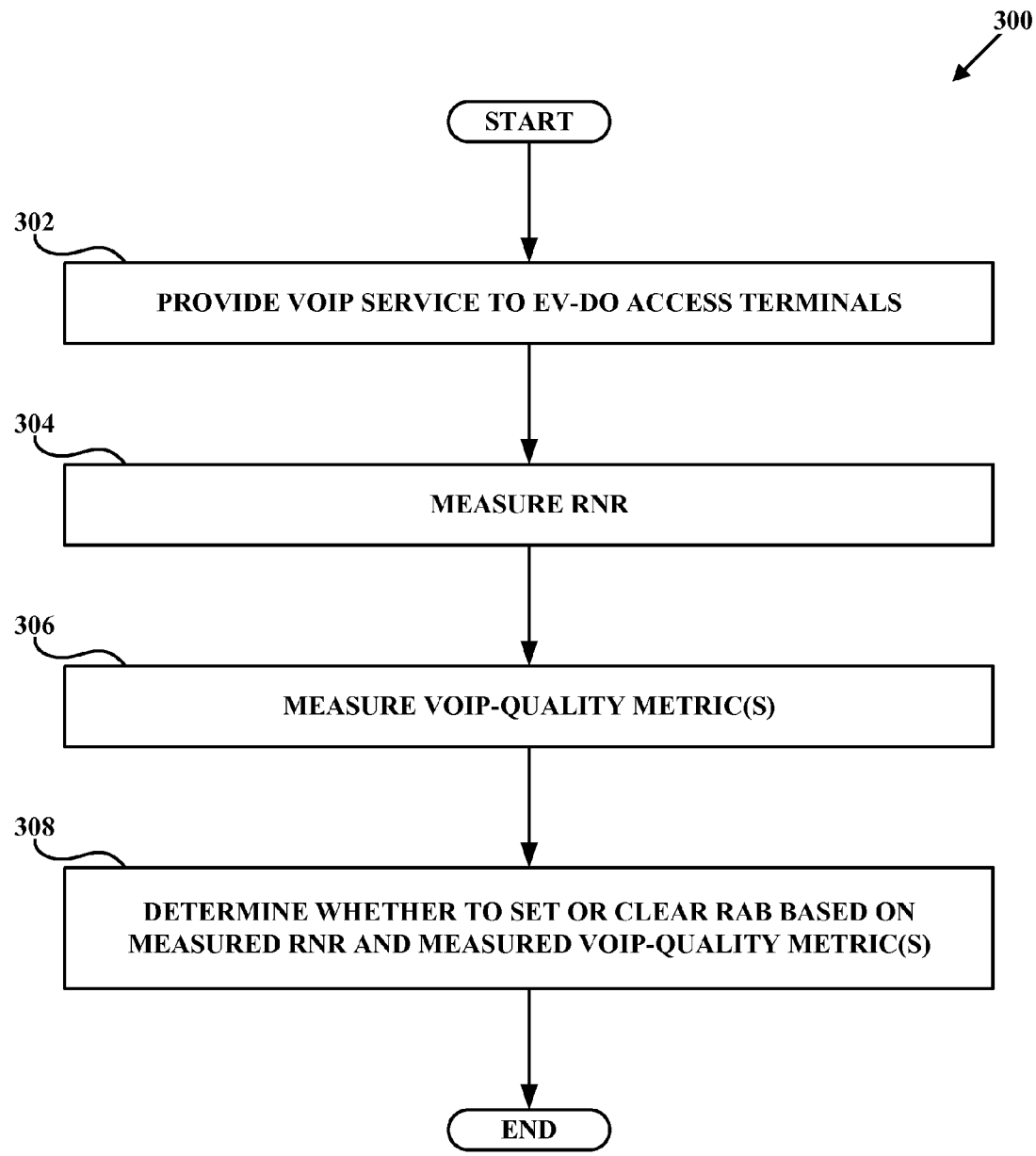
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when access node 104 provides VoIP service to EV-DO access terminals, which includes (a) providing EV-DO service in a wireless coverage area and (b) providing transport service over a packet-data network. At step 304, access node 104 measures RNR in the wireless coverage area. At step 306, access node 104 measures, over the packet-data network, each VoIP-quality metric in a set of one or more VoIP-quality metrics. At step 308, access node 104 determines whether to set or clear the RAB in the wireless coverage area based at least in part on the measured RNR and at least in part on the measured VoIP-quality metrics. These steps are explained in the following subsections.

And it should be noted that, although method 300 is described herein as being carried out by access node 104, this is not required. In some embodiments, method 300 may be carried out specifically by an RNC or BTS. In other embodiments, method 300 could be carried out by one or more servers, a gateway, a proxy, a BSC, a PDSN, some other network element, or perhaps some combination thereof. And other possibilities exist as well.

In general, it is preferable that access node 104 carry out method 300 repeatedly on a periodic basis, so as to dynamically adjust the RAB in the wireless coverage area to reverse noise rise and one or more VoIP-quality metrics such as delay, jitter, and packet loss.

i. Provide VoIP Service to EV-DO Access Terminals

At step 302, access node 104 provides VoIP service to EV-DO access terminals, such as access terminal 102. Note that carrying out step 302 includes (a) providing (Rel. 0 and/or Rev. A) EV-DO service in a wireless coverage area and (b) providing transport service over a packet-data network. The wireless coverage area could be a cell or a sector, as examples. In the balance of this description of method 300, a sector will be used as an illustrative wireless coverage area. Furthermore, in this example, access node 104 provides EV-DO service on a single carrier, referred to in this description as the sector/carrier; however, this is not to exclude the possibility of access node 104 providing service in more than one sector, or on more than one carrier per sector, and of carrying out embodiments of the present invention with respect to each sector-and-carrier combination.

Furthermore, it may be the case that access node 104, perhaps in cooperation with one or more network entities such as PDSN 106, provides the above-referenced transport service over a service provider's private packet-data network, the Internet, or, as illustrated in FIG. 1, directly over the service provider's privately-operated packet-data network (represented as PDN 108 in FIG. 1), and indirectly (such as via a network access server such as gateway 110) over the Internet (represented as PDN 112 in FIG. 1). Note that, in this example, the "service provider" could be the business entity that provides and operates access node 104 and likely also PDSN 106. Note further that "providing transport service" does not necessarily mean providing an entire network or end-to-end packet delivery; rather, "providing transport service" may simply mean providing connectivity with one or networks. And certainly other network arrangements are possible as well, without departing from the scope and spirit of the present invention.

Thus, in this example, access terminal 102 communicates over a wireless EV-DO air interface with access node 104, which then provides transport service for, among other types of data, VoIP packets transmitted between access terminal 102 and endpoint 114, across a communication path that includes PDSN 106, PDN 108, gateway 110, and PDN 112.

ii. Measure RNR

At step 304, access node 104 measures the RNR on the sector/carrier. As explained above, access node 104 may carry out step 304 in part by measuring a current level of noise on the reverse link on the sector/carrier, and then computing RNR as the difference between that current level of noise and a baseline level of noise on the reverse link. And recall that the baseline level of noise on the reverse link may correspond to an amount of noise present on the sector/carrier when the sector/carrier is unloaded, i.e. without any transmitting mobile stations. This baseline level may be measured during periodic coordinated silent intervals. Furthermore, as stated herein, the RNR that access node 104 measures in accordance with carrying out step 304 could be a most-recently-measured value, or perhaps an average of more than one value measured over some preceding time period, among other possibilities.

iii. Measure VoIP-Quality Metric(s)

At step 306, access node 104 measures, over a packet-data network, each VoIP-quality metric in a set of one or more VoIP-quality metrics. Note that the packet-data network referenced here in step 306 could be any packet-data network, such as PDN 108, PDN 112, or perhaps the combination of PDN 108, gateway 110, and PDN 112. PDSN 106 may also be included in this packet-data network where, as in this example, access node 104 is carrying out the measurement or measurements. However, in other embodiments, PDSN 106 may carry out one or more VoIP-quality-metric measurements, and then perhaps report those measurements and/or comparisons of those measurements to various threshold values.

In general, step 306 is related to taking VoIP-quality-metric measurements that provide information about transport conditions over a packet-switched path between a first network entity (e.g. access node 104 or PDSN 106) and the VoIP endpoint (e.g. endpoint 114) with which access terminal 102 is conducting or wishes to conduct a VoIP session. As stated above, in some embodiments, the VoIP endpoint may be a server (e.g. a media gateway), rather than the actual telephony device being used by a person on the other end of the call. Furthermore, as explained herein, the set of one or more VoIP-quality metrics measured in step 306 may include delay, jitter, packet loss, and/or any other VoIP-quality metric now known or later developed, without departing from the scope and spirit of the present invention.

iv. Set or Clear the RAB Based on the Measured RNR and the Measured VoIP-Quality Metric(s)

At step 308, access node 104 determines whether to set or clear the RAB for the sector/carrier, based at least in part on the measured RNR and at least in part on the one or more VoIP-quality metrics measured in connection with step 306. In some embodiments, access node 104 may maintain (e.g. store or have access to) a threshold value corresponding to each measurement taken. That is, access node 104 may maintain an RNR threshold and a set of one or more VoIP-quality-metric thresholds, and each of those VoIP-quality-metric thresholds may correspond to a respective VoIP-quality metric in the set of one or more VoIP-quality metrics.

As examples, access node 104 may store RNR threshold 202, delay threshold 252, jitter threshold 254, and packet-loss threshold 256. In this example, access node 104 considers RNR and all three of delay, jitter, and packet loss, though, it is not required that all four be considered. Back to this example, access node 104 may then determine whether the measured RNR is less than RNR threshold 202. If not, access node 104 may set the RAB and consider its analysis complete for this iteration of setting or clearing the RAB. Note in general that access node 104 need not perform an explicit comparison/calculation with respect to each metric (RF or transport) on each iteration of setting or clearing the RAB, though access node 104, in this example, still may be fairly said to be considering those metrics.

Back to this example, if the measured RNR is less than RNR threshold 202, access node 104 next determines whether the measured delay is less than delay threshold 252. If not, access node 104 sets the RAB and stops its analysis for this iteration. If so, access node 104 next determines whether the measured jitter is less than jitter threshold 254. If not, access node 104 sets the RAB and stops its analysis for this iteration. If so, access node 104 next determines whether the measured packet loss is less than packet-loss threshold 256. If not, access node 104 sets the RAB. If so, access node 104 clears the RAB. In either case, since access node 104 has assessed all four measurements, access node 104 stops its analysis for this iteration.

As is evident from the preceding paragraphs, in this example, access node 104 only clears the RAB if RNR and all considered VoIP-quality metrics fall below their respective thresholds. Note that this is just one implementation, and that other logic may be employed without departing from the scope and spirit of the present invention. Also, the order in which these measurement-and-threshold pairs were considered in the preceding paragraphs is for illustration and not by way of limitation. Other orders also fall within the scope and spirit of the present invention. And again, only one or two of those VoIP-quality metrics may be considered in some implementations, and other VoIP-quality metrics could be considered as well.

b. A Second Exemplary Method

Figure 4:
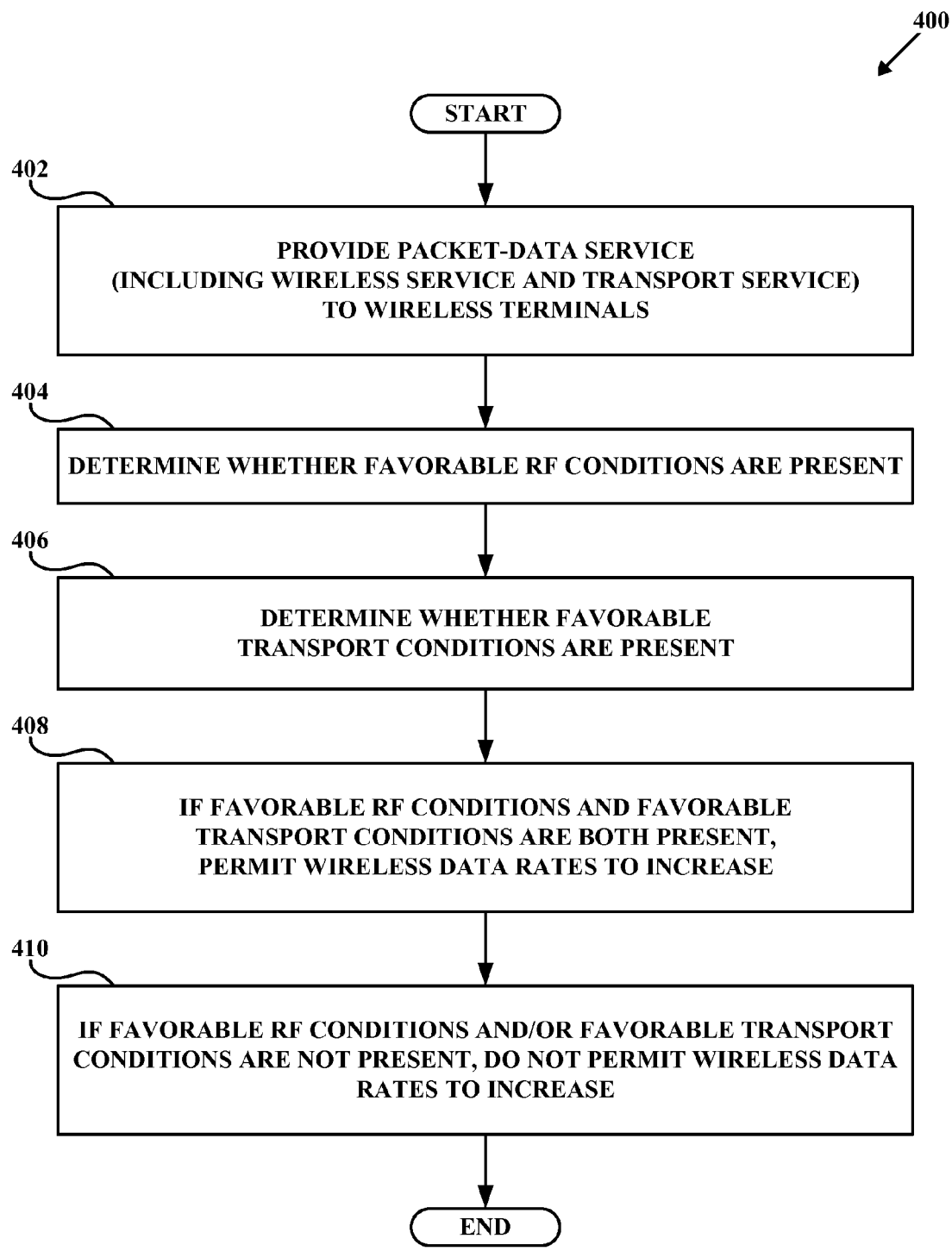
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for carrying out method 300, and/or any other entity or entities. Method 400 is similar to method 300, and thus is not described in as great of detail. As with method 300, method 400 is preferably carried out repeatedly on a periodic basis, so as to dynamically adjust wireless data rates to changing RF and transport conditions.

As shown in FIG. 4, method 400 begins at step 402, when access node 104 provides packet-data service to wireless terminals. In accordance with the present invention, the packet-data service includes a wireless-service component in a wireless coverage area, coupled with a transport-service component over a packet-data network. The wireless-service component could be or include EV-DO (e.g. Rel. 0 and/or Rev. A) service on a sector/carrier; moreover, the packet-data network over which the transport-service component is provided may be a packet-switched communication path extending between access node 104 (or an entity such as PDSN 106), and a packet-data-communication endpoint, such as endpoint 114 or another device.

At step 404, access node 104 determines whether favorable RF conditions are present in the wireless coverage area. This step may include measuring RNR and comparing that value (or an average of that and other RNR values) with an RNR threshold, such as RNR threshold 202. As one example, the most-recently-measured RNR falling below the RNR threshold may be sufficient to consider the RF conditions favorable. Instead or in addition, step 404 may involve consideration of any number of other indicators of favorable/unfavorable RF conditions, such as how many access terminals are operating on the sector/carrier, how occupied the paging-channel timeslots are, the forward-link transmission-power situation (e.g., the known ratio $E_c/I_{or}$), and/or any other indicators of sector/carrier load and/or favorable/unfavorable RF conditions.

At step 406, access node 104, perhaps in cooperation with one or more entities such as PDSN 106 and gateway 110, determines whether favorable transport conditions are present over the packet-data network. This may involve measurement of one or more of the VoIP-quality metrics described herein, along with comparison of those measured values with respective thresholds. As one example, having any one or any combination (such as all three) of the measured values of delay, jitter, and packet loss fall below their respective thresholds may be required for considering the network transport conditions to be favorable. Note that other now-known or hereafter-developed metrics of network conditions may be used as well, without departing from the scope and spirit of the present invention.

At step 408, if (a) it is determined in step 404 that favorable RF conditions are present and (ii) it is determined in step 406 that favorable transport conditions are present, access node 104 permits data-transfer rates for the wireless-service component to increase. In some embodiments, step 408 may take the form of clearing the RAB for the wireless coverage area.

At step 410, if (a) it is determined in step 404 that favorable RF conditions are not present and/or (ii) it is determined in step 406 that favorable transport conditions are not present, access node 104 does not permit (i.e. prevents) data-transfer rates for the wireless-service component to increase. In some embodiments, step 410 may take the form of setting the RAB.

4. Conclusion

Various exemplary embodiments have been described above. Those skilled in the art will understand, however, that changes and modifications may be made to those examples without departing from the scope of the claims.

What is claimed is:

1. A method comprising:
an access node providing voice over internet protocol (VoIP) service to Evolution Data Optimized (EV-DO) access terminals, wherein providing VoIP service comprises (a) providing EV-DO service in a wireless coverage area and (b) providing transport service over a packet-data network;
measuring reverse noise rise (RNR) in the wireless coverage area;
measuring, over the packet-data network, each VoIP-quality metric in a set of one or more VoIP-quality metrics;
maintaining an RNR threshold and a set of one or more VoIP-quality-metric thresholds, wherein each VoIP-quality-metric threshold corresponds to a respective VoIP-quality metric in the set of one or more VoIP-quality metrics:
determining whether the measured RNR is less than the RNR threshold;
determining whether each measured metric is less than its corresponding threshold;
if (i) the measured RNR is less than the RNR threshold and (ii) each measured metric is less than its corresponding threshold, then clearing the RAB; and
if (i) the measured RNR is not less than the RNR threshold and/or (ii) at least one measured metric is not less than its corresponding threshold, then setting the RAB.

2. The method of claim 1, wherein the wireless coverage area is a cell or a sector.

3. The method of claim 1, wherein the packet-data network comprises at least one of a service provider's private packet-data network and the Internet.

4. The method of claim 1, wherein measuring RNR comprises:
measuring a current level of noise on a reverse link; and
computing RNR as the difference between the current level of noise and a baseline level of noise on the reverse link.

5. The method of claim 4, wherein the baseline level of noise on the reverse link corresponds to an amount of noise in an unloaded wireless coverage area.

6. The method of claim 1, wherein the RNR threshold is approximately 5 dB.

7. The method of claim 1, wherein the set of one or more VoIP-quality metrics comprises at least one of delay, jitter, and packet loss.

8. The method of claim 1, wherein:
setting the RAB comprises making the RAB equal to 1; and
clearing the RAB comprises making the RAB equal to 0.

9. The method of claim 1, carried out repeatedly on a periodic basis, so as to dynamically adjust the RAB to RNR and the set of one or more VoIP-quality metrics.

10. An Evolution Data Optimized (EV-DO) access node comprising:
   a communication interface;
   a processor; and
   data storage comprising instructions executable by the processor to:
      provide voice over internet protocol (VoIP) service to EV-DO access terminals, wherein providing VoIP service comprises (a) providing EV-DO service in a wireless coverage area and (b) providing transport service over a packet-data network;
      measure reverse noise rise (RNR) in the wireless coverage area;
      measure, over the packet-data network, each VoIP-quality metric in a set of one or more VoIP-quality metrics;
      maintain an RNR threshold and a set of one or more VoIP-quality-metric thresholds, wherein each VoIP-quality-metric threshold corresponds to a respective VoIP-quality metric in the set of one or more VoIP-quality metrics;
      determine whether the measured RNR is less than the RNR threshold;
      determine whether each measured metric is less than its corresponding threshold;
      if (i) the measured RNR is less than the RNR threshold and (ii) each measured metric is less than its corresponding threshold, then clear the RAB; and
      if (i) the measured RNR is not less than the RNR threshold and/or (ii) at least one measured metric is not less than its corresponding threshold, then set the RAB.

11. The access node of claim 10, wherein the set of one or more VoIP-quality metrics comprises at least one of delay, jitter, and packet loss.

12. The access node of claim 10, wherein:
   the instructions to set the RAB comprise instructions to make the RAB equal to 1; and
   the instructions to clear the RAB comprise instructions to make the RAB equal to 0.

* * * * *